United States Patent
Honda et al.

(10) Patent No.: US 10,418,669 B2
(45) Date of Patent: Sep. 17, 2019

(54) METHOD OF PROPAGATION TEST ON BATTERY SYSTEM

(71) Applicant: Japan Electrical Safety & Environment Technology Laboratories, Shibuya-ku (JP)

(72) Inventors: Keizoh Honda, Hyogo (JP); Hideki Tsuruga, Hyogo (JP); Masachika Kodama, Osaka (JP); Takeshi Senoo, Hyogo (JP); Kenji Nishioka, Nara (JP); Hideo Ichimaru, Hyogo (JP)

(73) Assignee: Japan Electrical Safety & Environment Technology Laboratories, Shibuya-ku (JP)

( * ) Notice: Subject to any disclaimer, the term of this patent is extended or adjusted under 35 U.S.C. 154(b) by 451 days.

(21) Appl. No.: 15/227,118

(22) Filed: Aug. 3, 2016

(65) Prior Publication Data

US 2017/0059500 A1   Mar. 2, 2017

(30) Foreign Application Priority Data

Aug. 28, 2015   (JP) .................................. 2015-169321

(51) Int. Cl.
  *G01N 25/72*   (2006.01)
  *H01M 2/10*   (2006.01)
  (Continued)

(52) U.S. Cl.
  CPC ..... *H01M 10/4285* (2013.01); *H01M 10/052* (2013.01); *H01M 10/488* (2013.01); *Y02T 10/7011* (2013.01)

(58) Field of Classification Search
  CPC .. G01N 25/72; H01M 10/482; H01M 2/1072; H01M 2220/20; H01M 10/4285; H01M 10/052
  See application file for complete search history.

(56) References Cited

U.S. PATENT DOCUMENTS

| | | | | |
|---|---|---|---|---|
| 5,202,199 A | * | 4/1993 | Mitzutani | ............... H01M 2/02 429/1 |
| 2005/0073314 A1 | * | 4/2005 | Bertness | ............ G01R 31/3668 324/433 |
| 2017/0365827 A1 | * | 12/2017 | Okada | ..................... H01M 2/10 |

FOREIGN PATENT DOCUMENTS

| | | |
|---|---|---|
| JP | 2007-66773 | 3/2007 |
| JP | 5209896 | 6/2013 |

(Continued)

OTHER PUBLICATIONS

"Procedure of Propagation Test", JIS C 8715-2, 7.8.3, 2012, 36 pages.

(Continued)

*Primary Examiner* — Patrick Assouad
*Assistant Examiner* — Haidong Zhang
(74) *Attorney, Agent, or Firm* — Oblon, McClelland, Maier & Neustadt, L.L.P.

(57) ABSTRACT

A method of propagation test on a battery system has: a main irradiation step of irradiating a laser beam in prescribed conditions, on a light-receiving part of the outer member of a light-receiving cell, or on a light-receiving part which is arranged in contact with the outer member of the light-receiving cell, thereby to heat the light-receiving cell; a thermal runaway confirming step of confirming a thermal runaway of the light-receiving cell; an irradiation stopping step of stopping the laser-beam irradiation after the thermal runaway was confirmed in the thermal runaway confirming step; and a system integrity inspection step of inspecting an integrity of the cells other than the light-receiving cell after the irradiation stopping step. The prescribed conditions are conditions in which a melted scar is formed on the light-receiving part.

9 Claims, 17 Drawing Sheets

(51) Int. Cl.
*H01M 10/42* (2006.01)
*H01M 10/48* (2006.01)
*H01M 10/052* (2010.01)

(56) References Cited

FOREIGN PATENT DOCUMENTS

| | | |
|---|---|---|
| JP | 5223329 | 6/2013 |
| JP | 5691778 | 4/2015 |

OTHER PUBLICATIONS

"IEC 62619: Secondary Cells and Batteries Containing Alkaline or Other Non-Acid Electrolytes.—Safety Requirements for Secondary Lithium Cells and Batteries, for Use in Industrial Applications", IEC Committee Draft (CD), Annex A, International Electrotechnical Commission, IEC, Jul. 4-Sep. 5, 2014, 30 pages.

* cited by examiner

FIG. 10

| | CELL | BATTERY SYSTEM CASE | THERMAL RUNAWAY METHOD | CELL CONTAINER DAMAGE | THERMAL RUNAWAY RESULT | PROPERGATION TEST RESULT OBTAINED? | TEST RESULT |
|---|---|---|---|---|---|---|---|
| EXAMPLE 1 | RECTANGULAR PARALLELE- PIPED ALUMINIUM CAN | PLASTIC | FIBER LASER 1.5 kW | NO | THERMAL RUNAWAY AFTER 50 SEC | YES | OK |
| COMPARA- TIVE EXAMPLE 1 (1) | RECTANGULAR PARALLELE- PIPED ALUMINIUM CAN | PLASTIC | NAIL PENETRATION | INFLATION | NO THERMAL RUNAWAY | NO | NOT AVAILABLE |
| COMPARA- TIVE EXAMPLE 1 (2) | RECTANGULAR PARALLELE- PIPED ALUMINIUM CAN | PLASTIC | OVER- CHARGING | SEVERE INFLATION | THERMAL RUNAWAY AFTER 50 SEC | NO. BATTERY SYSTEM CASE BROKEN | NOT AVAILABLE |

FIG. 11

| | CELL | BATTERY SYSTEM CASE | THERMAL RUNAWAY METHOD | CELL CONTAINER DAMAGE | THERMAL RUNAWAY RESULT | PROPERGATION TEST RESULT OBTAINED? | TEST RESULT |
|---|---|---|---|---|---|---|---|
| EXAMPLE 2 | RECTANGULAR PARALLELE-PIPED STEEL CAN | STEEL | DISC LASER 2.5kW | NO | THERMAL RUNAWAY AFTER 80 SEC | YES | REJECT |
| COMPARA-TIVE EXAMPLE 2 (1) | RECTANGULAR PARALLELE-PIPED STEEL CAN | STEEL | NAIL PENETRATION | SMALL INFLATION | THERMAL RUNAWAY AFTER 10 MIN | YES | REJECT |
| COMPARA-TIVE EXAMPLE 2 (2) | RECTANGULAR PARALLELE-PIPED STEEL CAN | STEEL | OVER-CHARGING | SEVERE INFLATION | INTERRUPTED AFTER 80 MIN DUE TO LIQUID LEAKAGE AND FIRE | NO. INTERRUPTED BEFORE CELL RUNNAWAY | NOT AVAILABLE |

FIG. 13

| | CELL | BATTERY SYSTEM CASE | THERMAL RUNAWAY METHOD | CELL CONTAINER DAMAGE | THERMAL RUNAWAY RESULT | PROPERGATION TEST RESULT OBTAINED? | TEST RESULT |
|---|---|---|---|---|---|---|---|
| EXAMPLE 3 (1) | CIRCULAR CYLINDRICAL CAN A | PLASTIC | YAG LASER 0.8 kW | NO | THERMAL RUNAWAY AFTER 15 SEC | YES | OK |
| EXAMPLE 3 (2) | CIRCULAR CYLINDRICAL CAN B | PLASTIC | YAG LASER 0.6 kW | NO | THERMAL RUNAWAY AFTER 20 SEC | YES | REJECT |

FIG. 14

| | CELL | BATTERY SYSTEM CASE | THERMAL RUNAWAY METHOD | CELL CONTAINER DAMAGE | THERMAL RUNAWAY RESULT | PROPERGATION TEST RESULT OBTAINED? | TEST RESULT |
|---|---|---|---|---|---|---|---|
| EXAMPLE 4 | RECTANGULAR PARALLELE- PIPED ALUMINIUM CAN C | STEEL | CO2 LASER 3.5 kW | NO. (IRRADIATED ON LEAD-OUT TERMINAL) | THERMAL RUNAWAY AFTER 60 SEC | YES | REJECT |

FIG. 15

| | CELL | BATTERY SYSTEM CASE | THERMAL RUNAWAY METHOD | CELL CONTAINER DAMAGE | THERMAL RUNAWAY RESULT | PROPERGATION TEST RESULT OBTAINED? | TEST RESULT |
|---|---|---|---|---|---|---|---|
| EXAMPLE 5 (1) | LAMINATED CELL 1 | ALUMINIUM | FIBER LASER 0.6 kW | INFLATION (IRRADIATED ON BATTERY SYSTEM CASE) | THERMAL RUNAWAY AFTER 30 SEC | YES | REJECT |
| EXAMPLE 5 (2) | LAMINATED CELL 2 | ALUMINIUM | FIBER LASER 1 kW | INFLATION (IRRADIATED ON BATTERY SYSTEM CASE) | THERMAL RUNAWAY AFTER 50 SEC | YES | OK |

FIG. 16

| | CELL | BATTERY SYSTEM CASE | THERMAL RUNAWAY METHOD | CELL CONTAINER DAMAGE | THERMAL RUNAWAY RESULT | PROPERGATION TEST RESULT OBTAINED? | TEST RESULT |
|---|---|---|---|---|---|---|---|
| EXAMPLE 6 | CIRCULAR CYLINDRICAL CAN D | PLASTIC | FIBER LASER 1.2 kW | NO. (IRRADIATED ON METAL PART) | THERMAL RUNAWAY AFTER 30 SEC | YES | OK |

PRIOR ART

PRIOR ART

METHOD OF PROPAGATION TEST ON BATTERY SYSTEM

CROSS-REFERENCE TO RELATED APPLICATION

This application is based upon and claims the benefit of priority from Japanese Patent Application No. 2015-169321, filed Aug. 28, 2015; the entire content of which is incorporated herein by reference.

TECHNICAL FIELD

The present invention relates to a method or a procedure of propagation test on battery systems. A battery system has a plurality of cells (or unit cells) arranged and mechanically and electrically connected. Battery systems may include battery modules and battery packs, each of which incorporates a plurality of cells.

BACKGOUND ART

Lithium secondary batteries are now used as power supplies not only in the portable apparatuses such as mobile telephones and personal computers, but also in eco-friendly vehicles such as electric vehicles and plug-in hybrid electric vehicles. Further, they are used also in infrastructure equipment such as large power storage systems for storing energy. Therefore, the lithium secondary batteries need to have even higher reliability and integrity.

The lithium secondary battery has a separator provided between the anode and the cathode. The separator electrically isolates the electrode plates from each other. If such a cell is exposed to a high-temperature environment for a long time, the separator will contract. In this case, the anode and the cathode may physically contact each other, causing internal short circuit.

A method of evaluating the integrity of the battery system is disclosed in Japanese Patent No. 5,209,896. In that method, the integrity against the internal short circuiting in the battery system and in each cell thereof is determined. This has been proposed as a method to determine the overall integrity of the battery system undergoing internal short circuiting. In the method, foreign matter is interposed between the anode and the cathode of a cell and compressed with the pressure applied by a pressurizer, thereby locally breaking the separator provided between the anode and the cathode and inducing internal short circuiting. This method may be performed in manufacturing batteries, determining the integrity level of each battery. The integrity level of the mass-produced batteries can therefore be guaranteed.

The above-mentioned method developed to perform the internal short circuit test on small lithium secondary batteries includes a test step of inserting the foreign matter in the cell. In order to insert the foreign matter in the cell, the cell must be broken. The container of the small lithium secondary battery is thin, and it is comparatively easy to insert the foreign matter into the cell. Hence, the cell can be easily tested for its short circuiting property. It should be noted that the small lithium secondary battery cell finds its use in, for example, mobile telephones and personal computers, and that its storage capacity is typically 1 to 3 Ah.

By contrast, the storage capacity of any cell for use in large power storage systems or eco-friendly vehicles keeps increasing. Cells storing 100 Ah at most have been developed. The larger the storage capacity of the cell, the thicker the container wall of the cell will be. Alternatively, the container of the cell is made of stronger material such as steel or stainless steel. Consequently, because of rigidity, it is hard to break the cell container to insert the foreign matter into the cell and to ultimately induce short circuiting in the cell.

As the storage capacity of the cells increases, each cell stores more energy. Therefore, the internal short circuit test tends to be more difficult to perform since a careless error in inserting the foreign matter in the cell may cause a major accident. Even if the cell container is successfully broken and the foreign matter is well inserted, the internal short circuiting test will take a much longer time period than in testing a small lithium secondary battery for use in the portable apparatuses. As a result, the electrolyte filled in the cell may be dried out, possibly making it difficult to evaluate the internal short circuiting in the cell in some cases.

If the cell undergoes thermal runaway due to the internal short circuiting, the cell temperature may rise up to 200 degrees centigrade or higher. A large power storage system or an eco-friendly vehicle, in particular, has a battery system incorporating a number of secondary cells. If some of the secondary cells undergo thermal runaway, the energy of the thermal runaway may be extremely large, possibly causing a severe damage. In view of this, the Japanese Industrial Standards (JIS) states that in place of evaluating the short circuiting in the cell, a propagation test should be performed. In this test, a specific cell (fully charged) of a battery system is heated and caused to undergo thermal runaway, the heating is stopped after the heated cell has undergone the thermal runaway, the battery system is then made to stand for a specific time period, and it is finally determined whether the cells other than the firstly heated cell have any abnormality. The thermal runaway is confirmed by an abrupt temperature rise in the cell JIS C 8715-2; 7. 8. 3, "Procedure of Propagation Test" discloses, for example, a procedure of propagation test on a battery system. In this method, an electric resistance heater or a thermal conduction heater is used. Further, IEC 62619 CD (Committee Draft) Annex A discloses procedures of propagation tests. These documents, however, disclose only the technique of using a heater, a burner, a laser or an induction heater to achieve the thermal runaway. Indeed they disclose methods using overcharging or nail penetration of the cell, or both. However, they do not disclose any specific methods of causing cells of various storage capacities, cell types, anode-cathode combinations or cell sizes to undergo thermal runaway reliably. Note that several cell types are known, such as rectangular parallelepiped cells (see Japanese Patent No. 5,691,778), circular cylindrical cells (see JP 2007-66773A) and laminated cells.

The inventors of the present invention conducted various thermal runaway tests on the conventional cells. The results of the tests will be described as follows.

First, various thermal runaway tests were conducted on can-type cells, by means of nail penetration (see Japanese Patent No. 5,223,329). The results of these tests are shown in FIGS. 17 and 18. FIGS. 17 and 18 show the results of the thermal runaway tests performed in the apparently identical conditions, but the can-type cells were different. The results of the thermal runaway tests were entirely different. That is, in a case shown in FIG. 17, the cell temperature rose to 300 degrees centigrade or higher and the cell underwent thermal runaway in a relatively short time. In FIG. 18, however, the cell temperature rose, but up to about 100 degrees centigrade, and the cell did not undergo thermal runaway.

Then, thermal runaway tests were conducted on can-type cells by overcharging. The results of the tests are shown in FIGS. 19 and 20. FIGS. 19 and 20 show the results of the overcharging the can-type cells in the apparently identical conditions, but the can-type cells were different types. In these tests, both can-type cells indeed underwent thermal runaway, but 30 minutes or longer had passed before the cells were heated to 200 degrees centigrade or higher and underwent thermal runaway. The can-type cells severely inflated before they underwent thermal runaway.

Further, thermal runaway tests were conducted on laminated cells by overcharging. The results of these tests are shown in FIGS. 21 and 22. The tested laminated cells were of different types. In these tests, both laminated cells underwent thermal runaway, but 20 minutes or longer elapsed before they were heated to 200 degrees centigrade or higher and started undergoing the thermal runaway. The laminated cells severely inflated before they underwent thermal runaway.

In any battery system incorporating cells made of various materials, different storage capacities and different shapes, it is very important to make each cell undergo thermal runaway reliably in a short time in order to perform a reproducible and reliable propagation test on the battery system. In the method using nail penetration, however, some cells failed to undergo thermal runaway as described above. In the method using overcharging, it took a long time to cause thermal runaway in the designated cell, propagating heat from that cell to the adjacent cells, and ultimately providing unreliable propagation test results in some cases.

In the test using a heating device such as a burner, a relatively wide area is heated up, inevitably heating not only the designated cells but also some other cells, though the results of the test are not shown in drawings. As a consequence, no reproducible propagation test results could be obtained in some cases.

In tests using an induction heater, the designated cells could not be heated efficiently in some types of the battery systems, either. It took the cell a long time to undergo thermal runaway. Hence, the reliability of the propagation test results was impaired in some cases.

In recent years, a method utilizing a laser as s heat source has attracted attention, and is now being studied.

Laser quenching technique is known as a material-processing technique using a laser as a heat source. The inventors of the present invention conducted experiments in which a laser beam was irradiated on can-type cells in the same way as in laser quenching. As shown in FIG. 23, it took each can-type cell a long time to undergo thermal runaway, as in the case where the can-type cell is heated by a burner. While being irradiated with the laser beam, the can-type cell inflated, transferring the heat to the adjacent cells. Consequently, highly reliable propagation test results could not be acquired in some cases.

A series of experiments were conducted, in which the power of the laser was enhanced, making cells undergo thermal runaway within a shorter time period. As shown in FIG. 24, some cells underwent thermal runaway in a short time, and the cases of some other cells were melted with the high power of the laser and the electrolyte leaked or spilled out from the cells through the resultant openings.

SUMMARY OF THE INVENTION

The present invention has been made in view of the above. The object of the invention is to provide a procedure of propagation test, in which one of the cells incorporated in a battery system is made to undergo thermal runaway, thereby to evaluate the resistance of the thermal runaway propagation in the battery system, with reproducibility and reliability.

According to the present invention, there is provided a method of propagation test on a battery system including a plurality of cells, each having an outer member made of metal including a closed container made of metal, the method comprising: a main irradiation step of irradiating a laser beam in prescribed conditions, on a light-receiving part of the outer member of a light-receiving cell, which is one of the cells, the light-receiving part being made of metal, or on a light-receiving part made of metal which is arranged in contact with the outer member of the light-receiving cell, thereby to heat the light-receiving cell; a thermal runaway confirming step of confirming a thermal runaway of the light-receiving cell, while the main irradiation step is being performed; an irradiation stopping step of stopping the laser-beam irradiation after the thermal runaway was confirmed in the thermal runaway confirming step; and a system integrity inspection step of inspecting an integrity of the cells other than the light-receiving cell in the battery system after the irradiation stopping step, wherein the prescribed conditions are conditions in which a melted scar is formed on the light-receiving part.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which:

FIG. 10 is a table showing test results of example 1 of the propagation test according to the present invention and its comparative examples;

FIG. 11 is a table showing test results of example 2 of the propagation test according to the present invention and its comparative examples;

FIG. 13 is a table showing test results of examples 3 of the propagation tests according to the present invention;

FIG. 14 is a table showing test results of example 4 of the propagation test according to the present invention;

FIG. 15 is a table showing test results of examples 5 of the propagation tests according to the present invention;

FIG. 16 is a table showing test results of example 6 of the propagation test according to the present invention;

EMBODIMENTS

Figure 1:
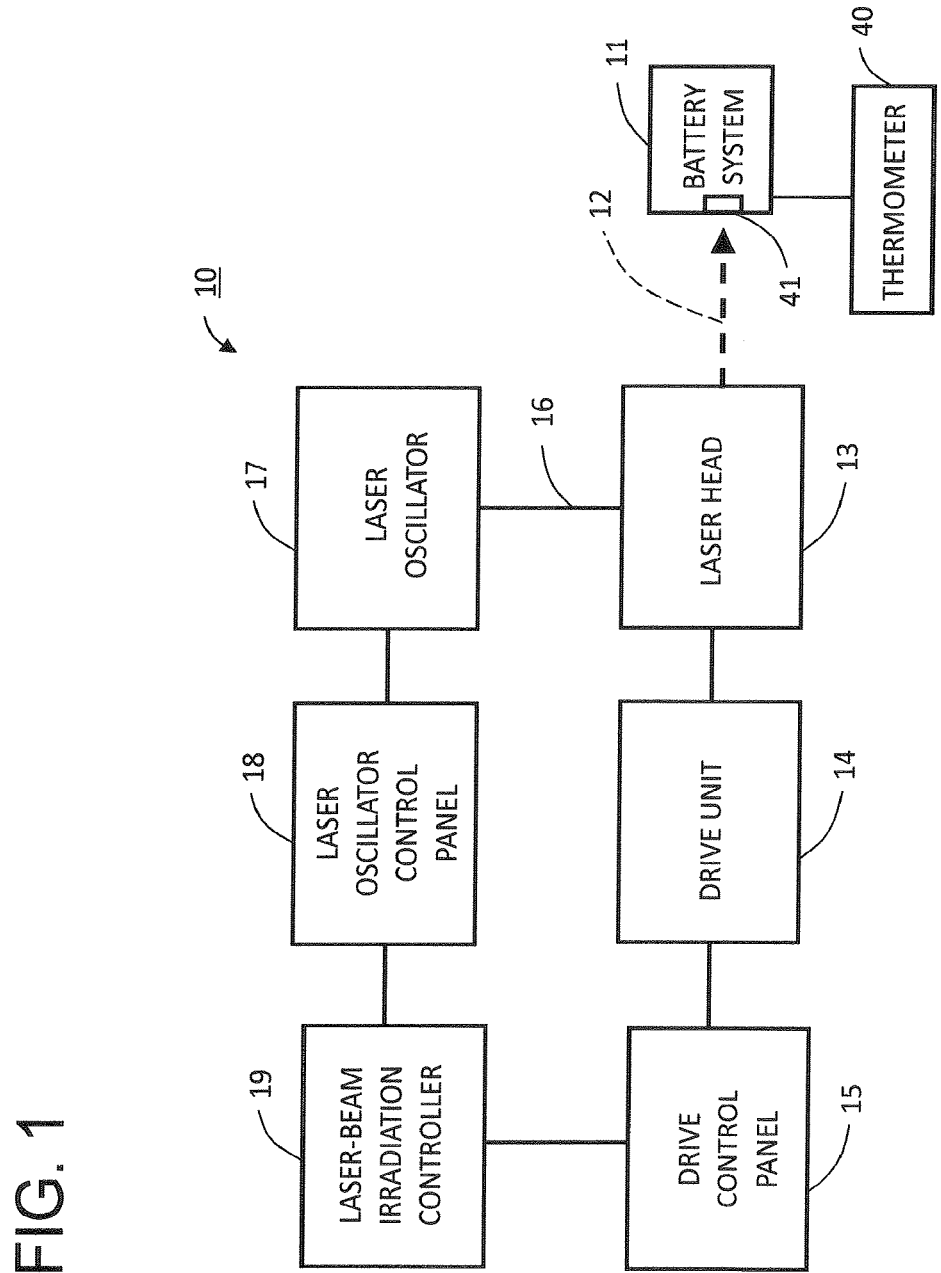
FIG. 1 is a block diagram showing the configuration of an embodiment of a laser-beam irradiation system used in procedures of propagation tests on battery systems according to the present invention.

Embodiments of the present invention will be described with reference to the accompanying drawings. FIG. 1 is a block diagram showing the configuration of an embodiment of a laser-beam irradiation system used in procedures of propagation tests on battery systems according to the present invention.

The laser-beam irradiation system 10 includes a laser head 13, a drive unit 14, a drive control panel 15, a laser-beam guiding optical fiber 16, a laser oscillator 17, a laser oscillator control panel 18, and a laser-beam irradiation controller 19. The laser head 13 irradiates a laser beam 12 on the light-receiving part 41 of a battery system 11, i.e., a test sample. The drive unit 14 holds the laser head 13, and moves the laser beam 12 to a prescribed position on the battery system 11 as instructed. The drive control panel 15 controls the drive unit 14. The laser-beam guiding optical fiber 16 guides the laser beam 12 to the laser head 13. The laser oscillator 17 generates a laser beam 12. The laser oscillator control panel 18 controls the power of the laser oscillator 17. The laser-beam irradiation controller 19 controls the laser oscillator 17 and the drive unit 14.

Thermometers 40 such as thermocouples are attached to the battery system 11 to detect the temperature of the battery system 11. The outputs of the thermometers 40 are sent to the laser-beam irradiation controller 19, and the change in the temperatures detected by the thermometers 40 are recorded in the laser-beam irradiation controller 19. The laser-beam irradiation controller 19 is configured to stop the emission of the laser beam 12 when the light-receiving cell 20a (described later) provided in the battery system 11 undergoes a thermal runaway.

The laser used here may be of the type that is generally used as a material-processing laser. A YAG laser, a $CO_2$ laser, a semiconductor laser, a fiber laser or a disc laser can be used. The fiber laser and the disc laser, which have recently found increasing use, are preferred because they are compact and generate light of high quality. That is, they collect light well and can output a desirable laser beam.

Any laser can be used here that has a wavelength falling within the range prescribed for material processing. Thus, the laser can be a semiconductor laser having a wavelength of hundreds of nanometers to a $CO_2$ laser having a wavelength of 10.6 μm. Any laser having a shorter wavelength is generally low in power, and may not be appropriate for use in the embodiments of the present invention. Any laser having a longer wavelength is absorbed at a low rate on the surface of the material piece, and may not be appropriate for use in the embodiments of the present invention.

The battery system 11 has a plurality of cells 20. The cells 20 are arranged as shown in FIG. 2, and they are electrically connected, although the electrical connections are not illustrated.

Figure 3:
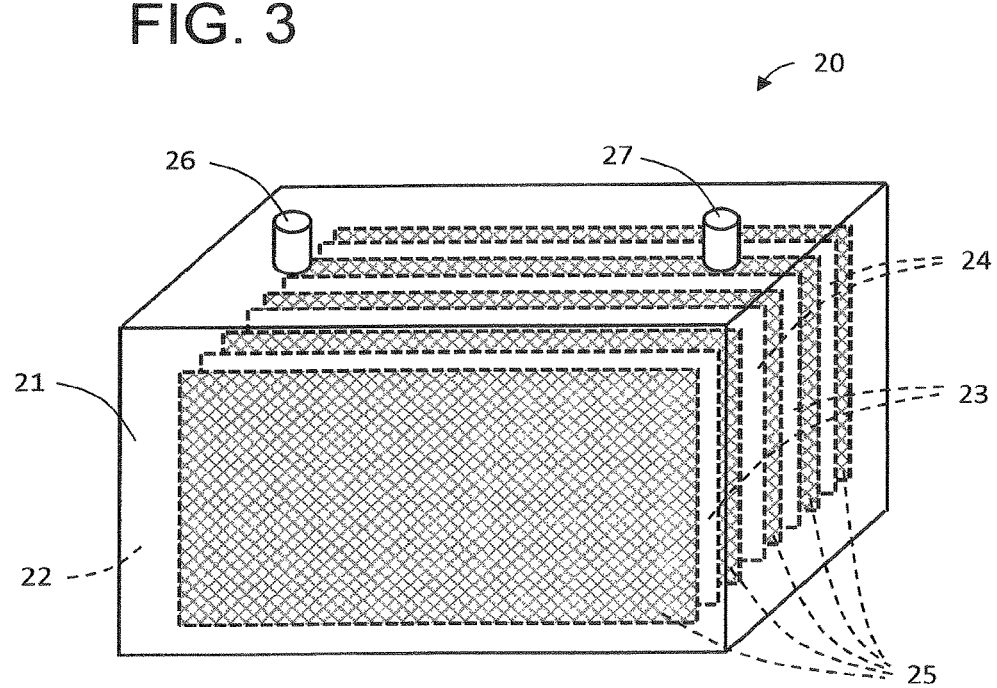
FIG. 3 is a schematic perspective view of an example of a cell constituting a battery system shown in FIG. 2.

Each cell 20 is, for example, a lithium secondary battery. As shown in FIG. 3, the cell 20 has a closed container (also called as "outer member" or "cell container") 21, electrolyte 22, anodes 23, cathodes 24, and insulating layers 25. The closed container 21 is made of metal. The electrolyte 22 is contained in the closed container 21. The anodes 23 and the cathodes 24 are immersed in the electrolyte 22 in the closed container 21. The insulating layers 25 are provided in the closed container 21, each interposed between the anode 23 and the cathode 24 adjacent thereto. As shown in FIG. 3, the anodes 23 and the cathodes 24, each shaped like a flat plate, are alternately arranged and parallel to one another. One plate-shaped insulating layer 25 is interposed between mutually adjacent anode 23 and cathode 24. Further, an insulating layer 25 is arranged between the anode 23 or the cathode 24 and the inner surface of the closed container 21.

Figure 2:
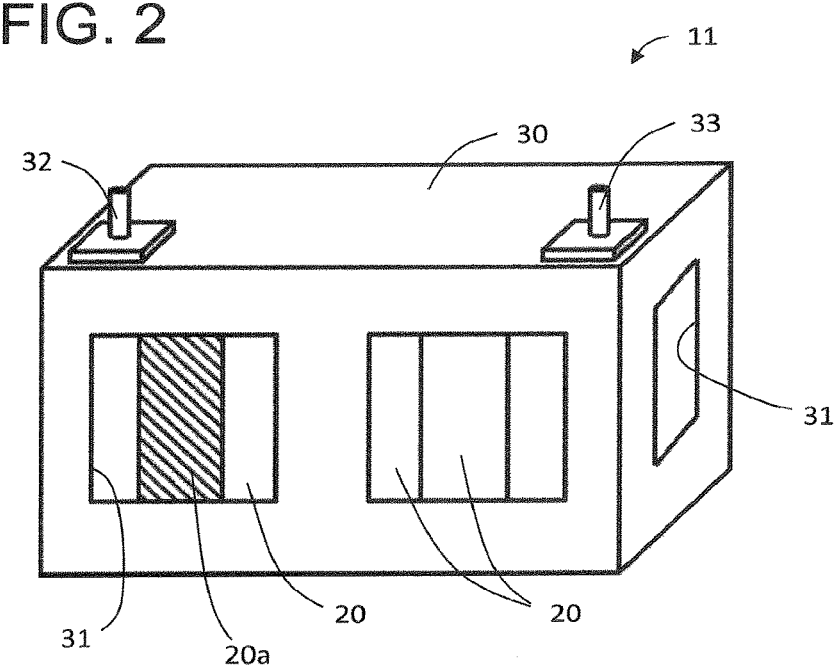
FIG. 2 is a schematic perspective view of an example of a battery system to be tested in a procedure of a propagation test according to a first embodiment of the present invention.

Although not shown in FIG. 2 or 3, the anodes 23 are electrically connected to one another, and the cathodes 24 are electrically connected to one another. Further, the anodes 23 are electrically connected to a cell terminal 26, and the cathodes 24 are electrically connected to a cell terminal 27. The cell terminal 26 and the cell terminal 27 are provided, protruding from the closed container 21. The cell terminals 26 and 27 may be also referred to as "protruding metal member" or "outer member". FIG. 3 does not show thickness of the anodes 23, the cathodes 24 or the insulating layers 25.

In the embodiment shown in FIGS. 2 and 3, the closed container 21 is rectangular parallelepiped. Cells 20 are incorporated and arranged in a rectangular parallelepiped battery system case 30 made of plastic. The battery system case 30 has case openings 31 for cooling the cells 20, and ultimately for cooling the battery system 11 as a whole. Battery terminals 32 and 33 made of metal protrude from the battery system case 30. In the battery system case 30, the cell terminals 26, 27 of the cells 20 are connected to each other via electric wires (not shown). The cells 20 may be connected in series, in parallel, or in combination of series and parallel.

Figure 4:
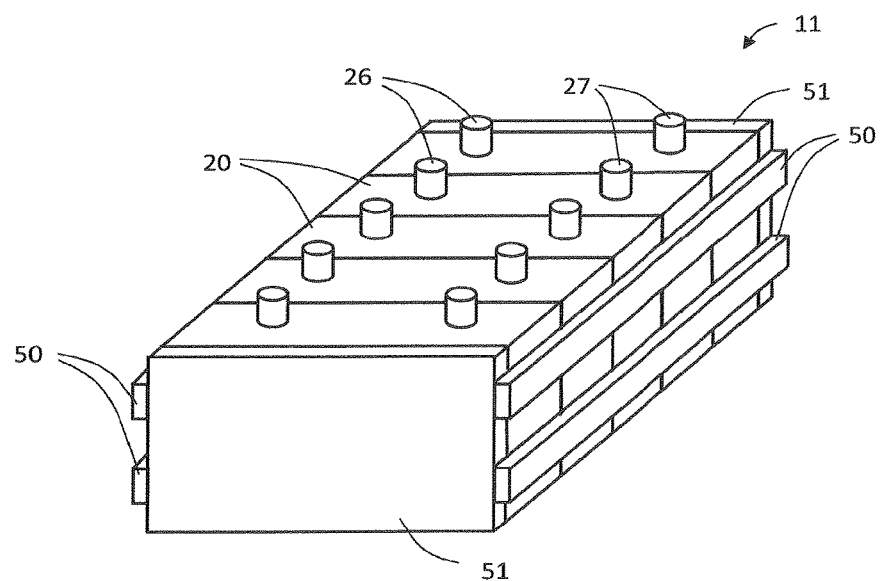
FIG. 4 is a schematic perspective view of another example of a battery system different from the one shown in FIG. 2.

FIG. 4 is a schematic perspective view of another battery system different from the battery system of FIG. 2, for explaining another procedure of propagation test according to the present invention for performing the first embodiment. Like the battery system of FIG. 2, this battery system has a plurality of cells 20 that are rectangular parallelepiped, arranged and combined together in a unit. However, as shown in FIG. 4, the cells 20 are not incorporated in a battery system case 30 as shown FIG. 2. Instead, the cells 20 are bundled together with fastening members 50 and 51. In FIG. 4, the electric wires electrically connecting the cells 20 are not illustrated.

First Embodiment

Figure 5:
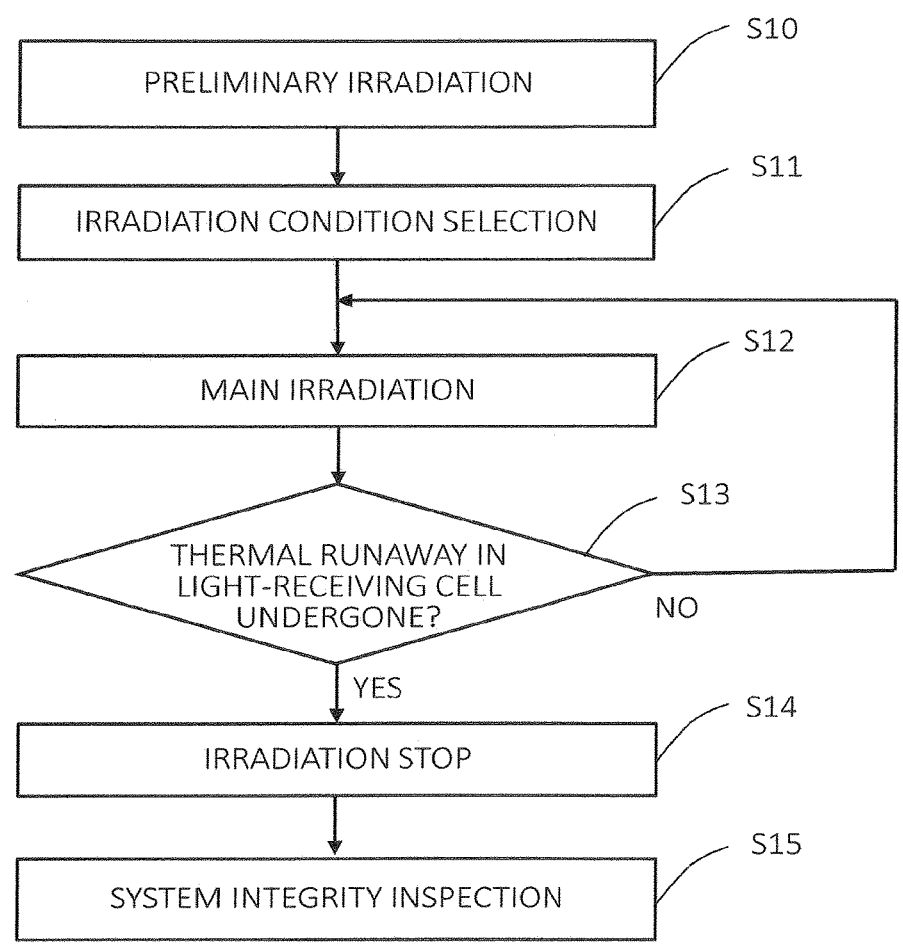
FIG. 5 is a flowchart showing a procedure of propagation test on the battery system, according to the first embodiment of the present invention.

The first embodiment of the invention, which is a procedure of propagation test on the battery system 11 by using the laser-beam irradiation system 10, will be described with reference to FIG. 5. FIG. 5 is a flowchart showing the procedure of a propagation test on the battery system, according to the first embodiment of the present invention.

In this embodiment, a laser beam 12 is irradiated on one cell (namely, a light-receiving cell 20a) of the cells 20 constituting the battery system 11 at a metal light-receiving part 41 located outside the light-receiving cell 20a. The light-receiving cell 20a is thereby heated and made to undergo thermal runaway, and it is determined whether the other cells 20 in the same battery system 11 undergo thermal runaway or not. The power of the laser beam 12 irradiated on the light-receiving cell 20a is controlled within an appropriate range, thereby heating the light-receiving cell 20a and causing the same to undergo thermal runaway. The method according to the first embodiment will be explained, in a case where the closed container 21 of the cell 20, which is made of metal, constitutes a light-receiving part 41 (FIG. 1).

First, a preliminary irradiation step S10 is performed to determine appropriate conditions for irradiating the laser beam 12 on the light-receiving cell 20a. In the preliminary irradiation step S10, one of the cells 20 constituting the battery system 11 to be tested is put separately, and the laser-beam irradiation system 10 irradiates the laser beam 12 on the outer surface (i.e., light-receiving part 41 for preliminary test) of the closed container 21 of the cell 20 used as preliminary test sample. At this time, the power of the laser beam 12 is changed, determining the appropriate conditions for irradiating the beam. The appropriate conditions for irradiating the beam are those in which the laser beam 12 is irradiated not to melt down the light-receiving part for preliminary test (i.e., closed container 21 in this case), but to form a melted scar on the light-receiving part. If the power of the laser beam 12 is too low, the light-receiving part will have no melted scars. If the power of the laser beam 12 is too high, the light-receiving part and further the cell itself for preliminary test will melt down.

In the preliminary irradiation step S10, it can be visually determined whether a melted scar has been formed on the outer surface of the closed container 21 of the cell 20, while moving the beam spot on the surface of the closed container 21. In the preliminary irradiation step S10, the laser beam 12 may not be irradiated on one cell 20, and may be irradiated on a separated test container (not necessarily closed) identical in structure to the closed container 21 of the cell 20. Further, the laser beam 12 may be irradiated on a metal flat plate piece made of the same material and having the same thickness as the closed container 21 may be used as light-receiving part for the preliminary test.

As the result of the preliminary irradiation step S10, the conditions for irradiating the beam 12, appropriate for testing the battery system 11, can be selected (irradiation condition selecting step S11).

Next, a laser beam 12 is irradiated on the battery system 11 that should be tested, as a main irradiation step S12. That is, the laser beam 12 is irradiated on the light-receiving part of the light-receiving cell 20a, thereby heating the light-receiving cell 20a. The light-receiving cell 20a is one of the cells constituting the battery system 11. More precisely, the laser beam 12 is irradiated on the surface of the closed container 21 of the light-receiving cell 20a through the case opening 31 in the battery system case 30 as illustrated in FIG. 2, for example. At this time, the laser beam 12 is irradiated in the appropriate conditions determined in the irradiation condition selecting step S11. The light-receiving cell 20a can therefore be heated appropriately, not melting down the light-receiving part and forming a melted scar on the light-receiving part. It is desirable to confirm, by naked-eye inspection, whether a melted scar is formed, while moving the laser-beam spot on the outer surface of the closed container 21 of the light-receiving cell 20a.

The preliminary irradiation step S10 may be skipped if a battery system 11 identical or similar in structure to the battery system 11, or a cell 20 of the battery system was tested in the past by irradiating a laser beam on the battery or the cell, determining the optimum irradiation conditions. Even if the data acquired from such a test in the past is not available, the preliminary irradiation step S10 may be skipped, and the power of the laser beam may be gradually increased until an optimum power is detected and may then be kept irradiated at the optimum power.

In Step S12, the thermometer 40 detects the changes in the temperature of the light-receiving cell 20a.

From the temperature change detected in Step S12 it is determined whether the temperature of the light-receiving cell 20a has exceeded a prescribed threshold value (e.g., 200 to 300 degrees centigrade), thereby confirming whether the light-receiving cell 20a has undergone thermal runaway, as a thermal runaway confirming step S13. Until the thermal runaway is confirmed in the thermal runaway confirming step S13, the main irradiation step S12 is continued. In the thermal runaway confirming step S13, thermal runaway may be detected from bursting sound or ignition.

When the thermal runaway is confirmed in the thermal runaway confirming step S13, the irradiation of the laser beam is stopped as an irradiation stopping step S14. In the irradiation stopping step S14, the laser-beam irradiation controller 19 and the laser oscillator control panel 18 automatically stop the irradiation of the laser beam in response to a signal coming from the thermometer 40 when the temperature of the light-receiving cell 20a exceeds a prescribed threshold value. Alternatively, the operator of the laser-beam irradiation system 10 may keep monitoring the output of the thermometer 40 and may manually stop the irradiation of the laser beam when the temperature of the light-receiving cell 20a exceeds the prescribed threshold value.

After the irradiation stopping step S14, battery system 11 is left to stand for a prescribed time period (e.g., 1 hour) in order to determine whether any other cells 20 of the battery system 11 have caught fire from the light-receiving cell 20a. Then, the battery system 11 is disassembled, and it is inspected to determine whether any other cells 20 have caught fire or not, as a system integrity inspection step S15. In the system integrity inspection step S15, it may be determined whether any other cells 20 have caught fire by detecting the temperatures of the other cells while the battery system 11 remains left to stand.

As described above, in the main irradiation step S12 the laser beam 12 is irradiated on the outer surface of the closed container 21 of the light-receiving cell 20*a*, which is made of metal. Alternatively, the cell terminals 26 and 27 of the light-receiving cell 20*a* that are made of metal or the metal parts (not shown) secured to the light-receiving cell 20*a*, each being a protruding metal part located outside the cell, may be used as light-receiving part, and the laser beam 12 may be irradiated on the cell terminals 26 and 27 or on the metal parts. If the battery system case 30 is made of metal, a part of the battery system case 30, which is located near the position where the battery system case 30 contacts, at its inner surface, the light-receiving cell 20*a*, may be used as a light-receiving part. In this case, the laser beam 12 may be irradiated on the outer surface of the battery system case 30.

Second Embodiment

The second embodiment of the invention, which is a procedure of propagation test on battery systems will be described. The laser-beam irradiation system 10 used in this embodiment is identical to the system (shown in FIG. 1) used in the first embodiment.

Figure 6:
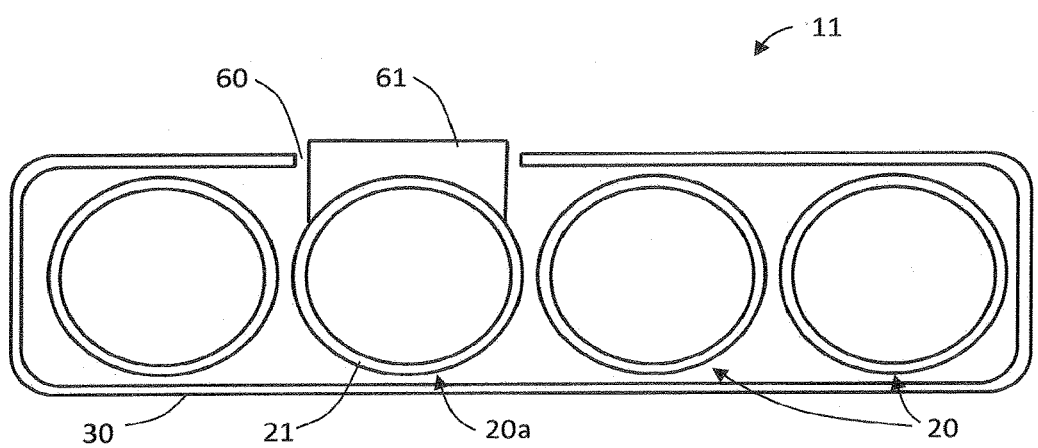
FIG. 6 is a schematic cross sectional view of an example of a battery system to be tested in a procedure of a propagation test according to a second embodiment of the present invention.

FIG. 6 is a sectional view schematically showing the configuration of a battery system tested by the procedure of propagation test, i.e., the second embodiment of the invention.

As shown in FIG. 6, the cells 20 are shaped like circular cylinders, and are arranged in parallel, forming a single row. The cells 20 are housed in a battery system case 30 which is almost rectangular parallelepiped. The cells 20 constitute a battery system 11.

Figure 7:
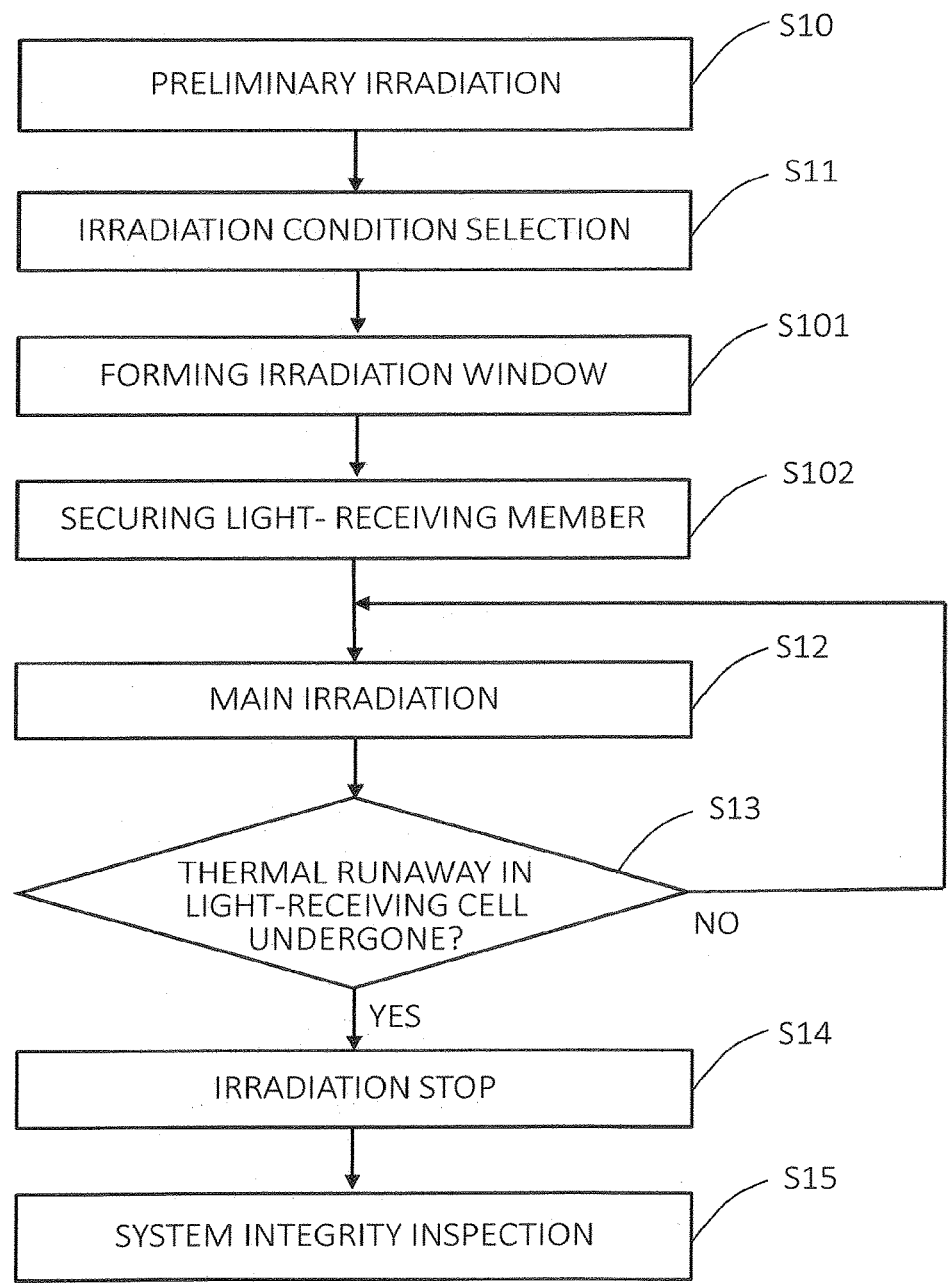
FIG. 7 is a flowchart showing a procedure of propagation test on the battery system, according to the second embodiment of the present invention.

FIG. 7 is a flowchart showing the procedure of the propagation test, according to the second embodiment of the present invention. In the second embodiment, an irradiation window forming step S101 is performed after the irradiation condition selecting step S11 and before the main irradiation step S12. In the irradiation window forming step S101, a part of the battery system case 30 of the battery system 11 is cut out to form an irradiation window 60. Further, after the window forming step S101, a light-receiving member arranging step S102 is performed, securing a light-receiving member 61 to a light-receiving cell 20*a*. The other steps are identical to those performed in the first embodiment.

In a circular cylindrical cell 20 having a closed container 21 that has a relatively small wall thickness, the closed container 21 may be melted down when a laser beam is irradiated on it. It may therefore be difficult, in some cases, to irradiate a laser beam of an appropriate power level to leave a melted scar on the surface of the closed container 21. Hence, in this embodiment, a part of the battery system case 30 is cut out, making the irradiation window 60, and the light-receiving member 61 having a larger wall thickness than the closed container 21 of the circular cylindrical cell 20 is secured to the light-receiving cell 20*a* located at the irradiation window 60. The light-receiving member 61 is used as light-receiving part, and a laser beam of a power just enough to form a melted scar is irradiated on the surface of the light-receiving member 61. As a result, the light-receiving member 61 can thereby be prevented from melting down. Thus, the light-receiving cell 20*a* can be appropriately heated, while preventing the light-receiving member 61 from being melted down as well as avoiding the closed container 21 from melting down.

In the process sequence described above, the window forming step S101 can be skipped, if the battery system case 30 has case openings 31 as shown in FIG. 2, or if the battery system 11 does not have a battery system case 30 as shown in FIG. 4.

If the battery system case 30 is made of metal, the light-receiving member 61 may be attached to the outer surface of the battery system case 30, which is located near the position where the battery system case 30 contacts, at its inner surface, of the light-receiving cell 20*a*. In such a case, the light-receiving member 61 is used as light-receiving part and receives the laser beam 12.

RESULTS OF THE EXPERIMENTS

The results of the various experiments the inventors of the present invention have conducted will be described below.

(Preliminary Test)

A preliminary test was performed, in which a fiber laser was used, irradiating a laser beam on one cell removed from a battery system, while measuring the temperature of the cell by means of a thermocouple. The cell 20 was of the type constituting the battery system 11 shown in FIG. 3, and had a closed container 21 (i.e., housing) made of aluminum alloy. Since aluminum alloy has high reflection factor with respect to laser beams, the temperature of the cell did not rise as desired. Therefore, graphite coating agent was coated on the surface of the cell to increase the beam-absorbing factor, and then a laser beam was irradiated on the cell. In this case, however, no abrupt temperature rise could be observed. The temperature of the cell indeed rose with time, but the graphite coating agent peeled off. At the time the coating agent peeled off, the experiment was interrupted.

Then, the laser power was increased, and the laser beam was irradiated on the cell. Then, the cell container made of aluminum alloy was melted within a few seconds, making a hole in the surface of the cell container. Through the hole, the electrolyte leaked out from the cell. As the laser beam was further irradiated on the cell, the electrolyte caught fire. At that time, the experiment was interrupted.

Figure 8:
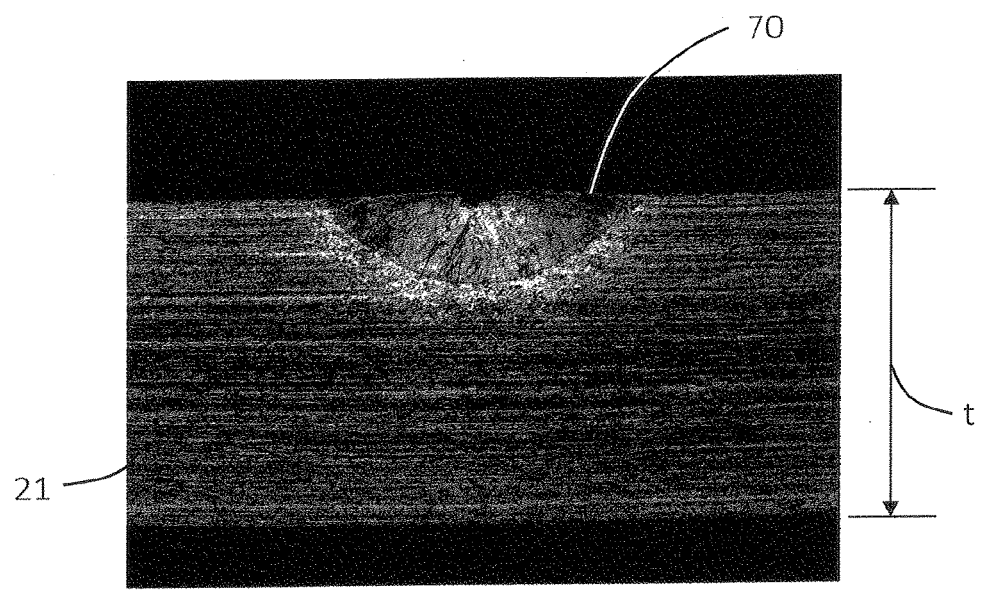
FIG. 8 is a photograph of a cross section of a melted scar in a closed container obtained by a preliminary irradiation in the first embodiment of the propagation test according to the present invention.

Thereafter, the inventors of the present invention conducted experiments in various ways, and found that the cell temperature readily rises if a melted scar is formed on the surface of the cell container made of aluminum alloy before the cell container made of aluminum alloy is melted down. An example of a cross section of the cell container having the melted scar is shown in FIG. 8. FIG. 8 is a magnified photograph of the closed container 21 (housing made of aluminum alloy) having wall thickness "t" of about 1.0 mm and irradiated with a beam emitted from a 1.5 kW fiber laser. As seen from the photograph, a melted scar 70 was formed on the surface of the closed container 21. Thus, desirable laser heating was achieved since the laser beam irradiated on the closed container 21 had formed a melted scar on the outer surface of the closed container 21, greatly increasing the beam-absorbing factor at the surface of the closed container and ultimately accomplishing a desirable laser heating.

Example 1

Figure 9:
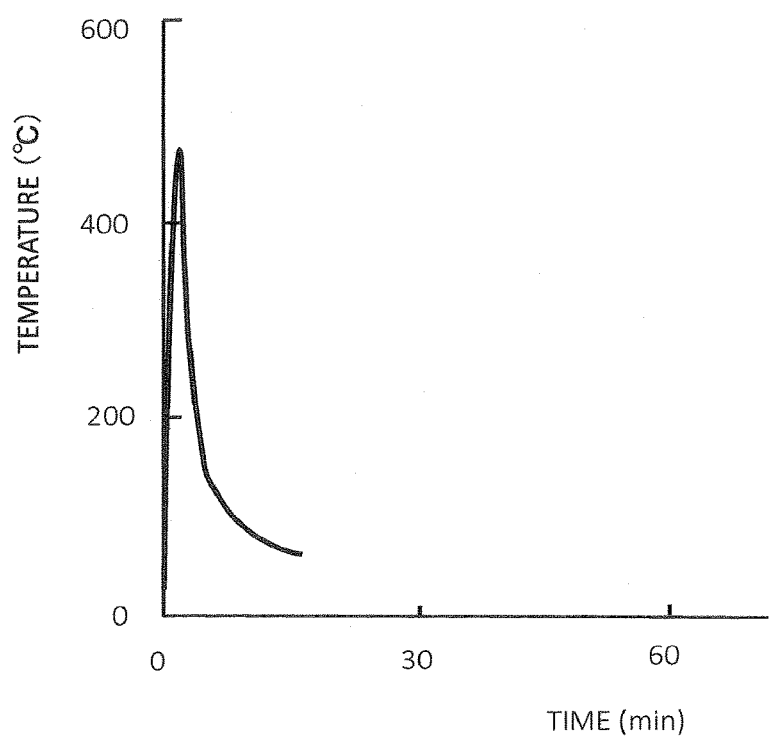
FIG. 9 is a graph showing a measured temperature transient of the light-receiving cell in the first embodiment of the propagation test according to the present invention.

In the preliminary test, a laser beam was irradiated on a rectangular parallelepiped cell in the same conditions as used to form the melted scar of FIG. 8 (namely, using the fiber laser having power of 1.5 kW). As shown in FIG. 9, the cell temperature rose above 200 degrees centigrade within 20 seconds, and the rectangular parallelepiped cell underwent thermal runaway. On the basis of these experiment results, a propagation test was performed on the light-receiving cell 20a provided in the battery system 11 of FIG. 2, by irradiating a laser beam in the appropriate conditions determined in the preliminary test. That is, a beam was emitted from a 1.5 kW fiber laser, forming a melted scar on the light-receiving cell 20a, and the irradiation of the laser beam was stopped when the cell underwent thermal runaway. Then, the battery system 11 was left to stand for 1 hour, and the battery system 11 was examined. The cells 20 other than the light-receiving cell 20a in the battery system 11 did not catch fire and did not rupture. Thus, the propagation test was correctly performed, proving the fire resistance performance of the battery system.

Figure 18:
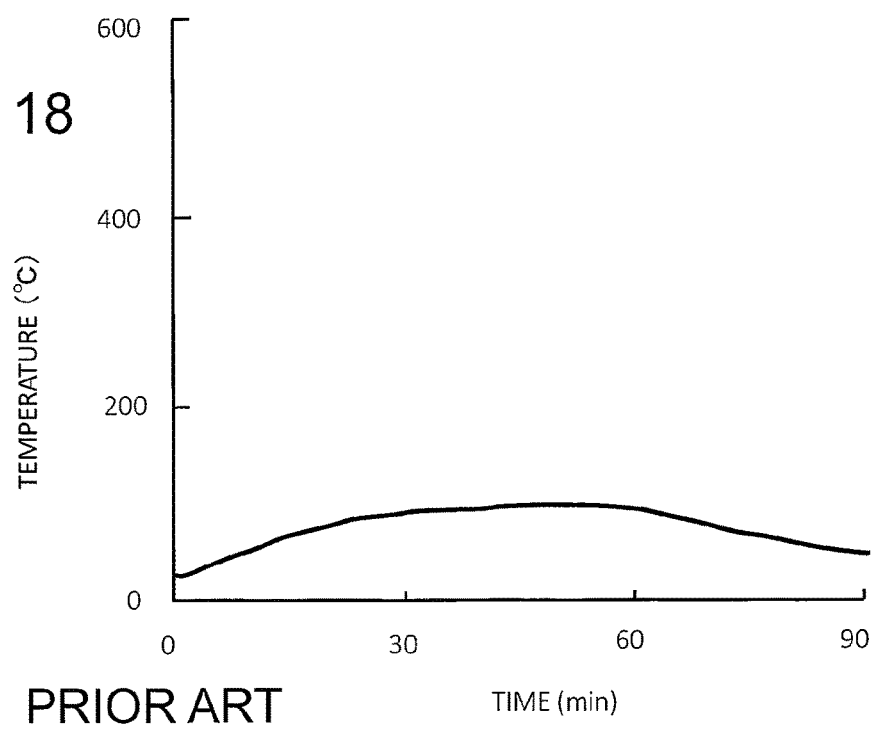
FIG. 18 is a graph showing a measured temperature transient in a can-type cell when a thermal runaway did not occur in a thermal runaway test using a different can-type cell and under an apparently identical condition as in FIG. 17.
Figure 19:
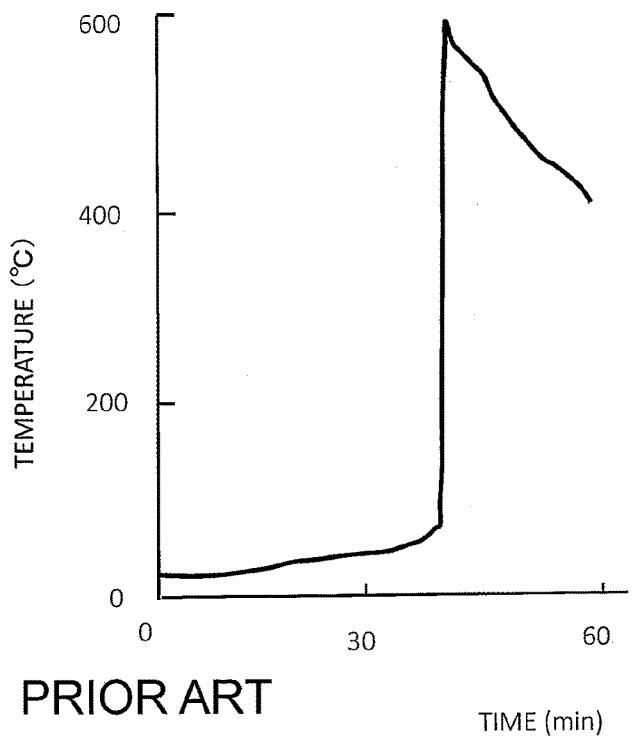
FIG. 19 is a graph showing a measured temperature transient in a can-type cell when a thermal runaway test was conducted using an overcharging method.
Figure 20:
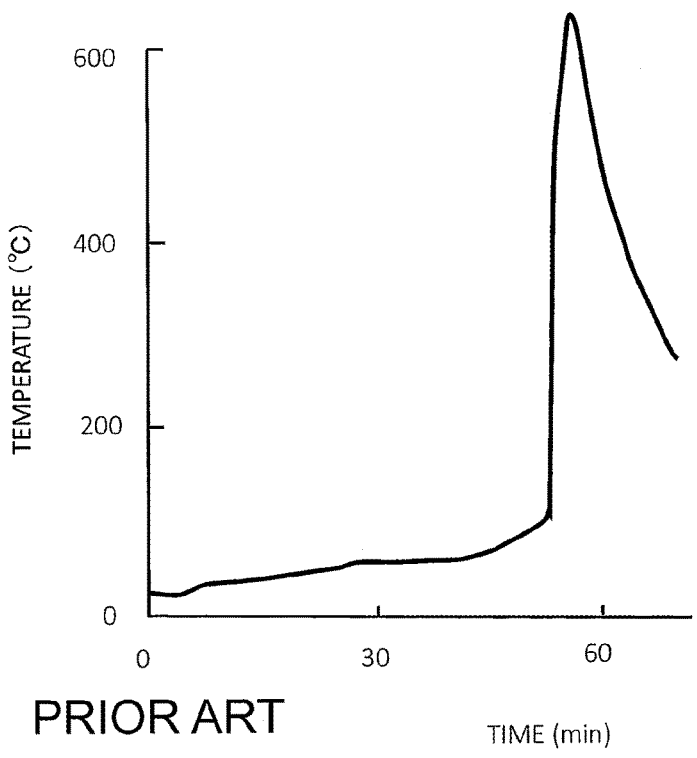
FIG. 20 is a graph showing a measured temperature transient in a can-type cell in a thermal runaway test using a different can-type cell and under an apparently identical condition as in FIG. 19.
Figure 21:
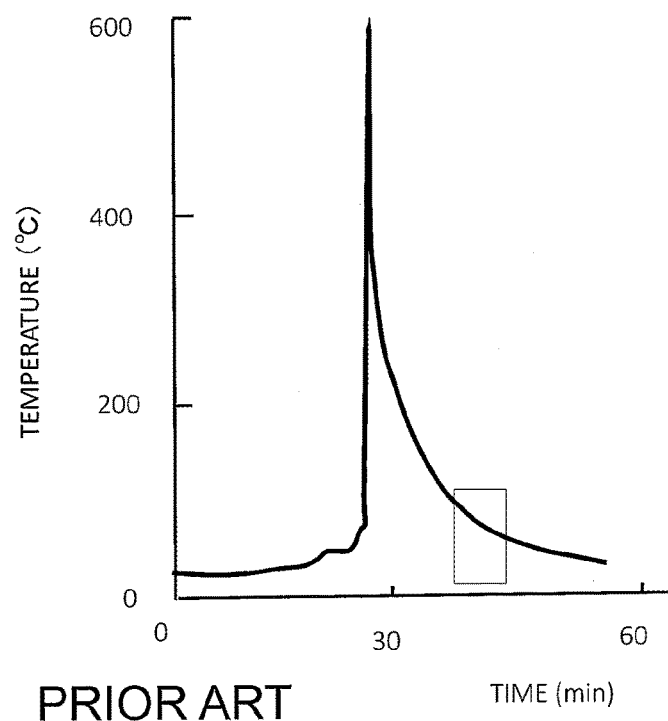
FIG. 21 is a graph showing a measured temperature transient in a laminated cell when a thermal runaway test was conducted using an overcharging method.
Figure 22:
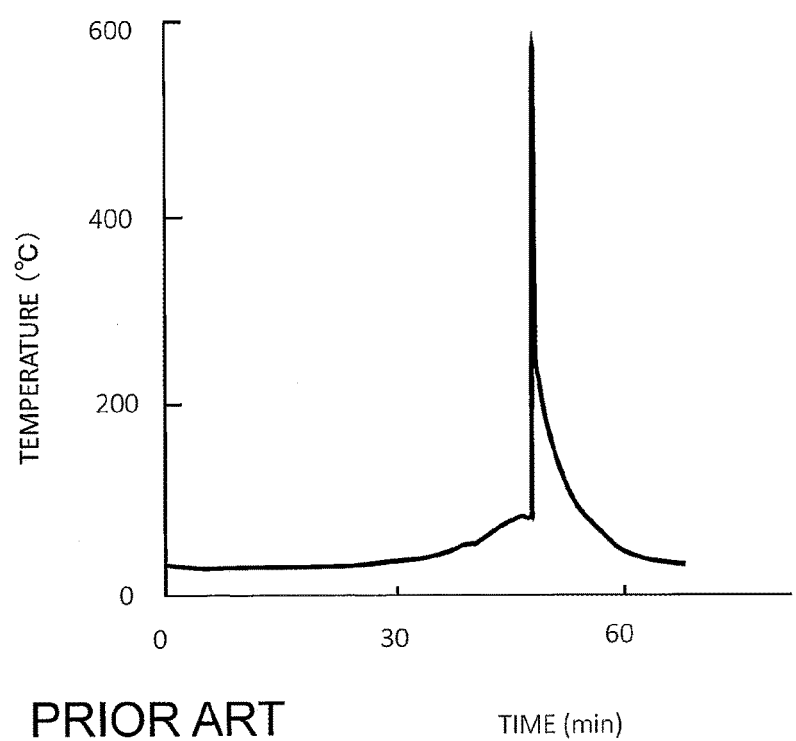
FIG. 22 is a graph showing a measured temperature transient in a laminated cell in a thermal runaway test using a different laminated cell and under an apparently identical condition as in FIG. 21.
Figure 23:
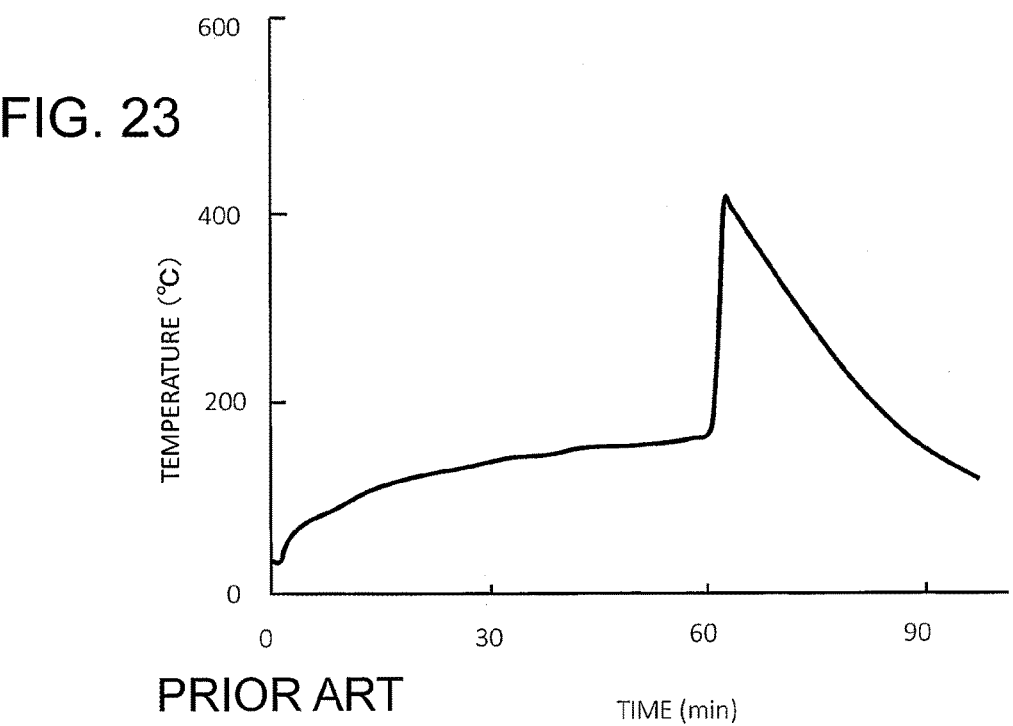
FIG. 23 is a graph showing a measured temperature transient in a can-type cell when a thermal runaway test was conducted using a laser as a heat source in a similar way as laser quenching.
Figure 24:
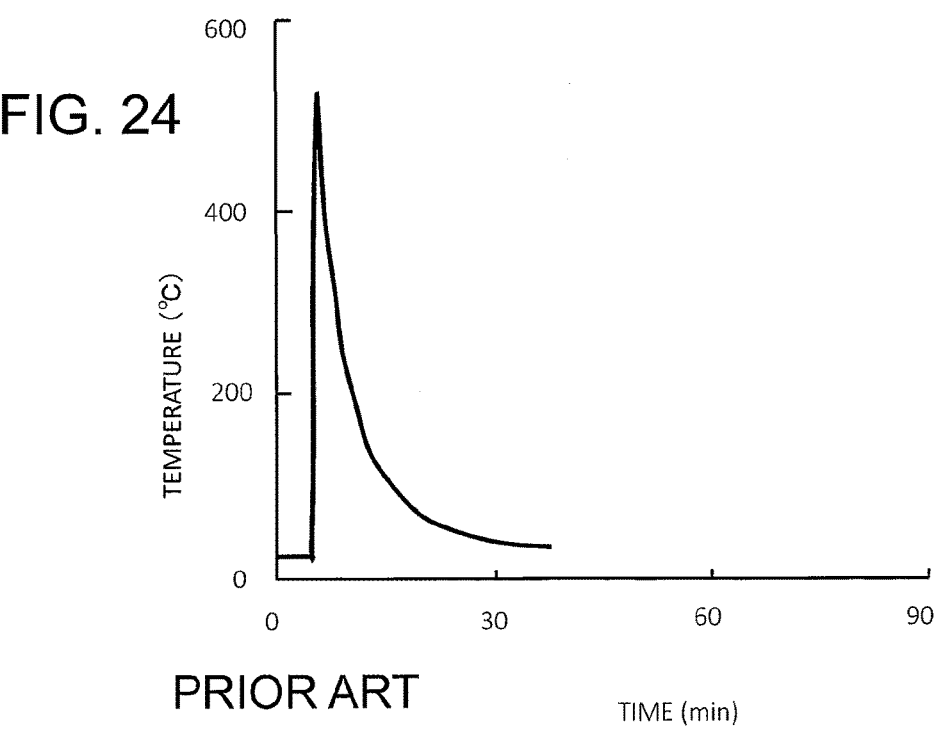
FIG. 24 is a graph showing a measured temperature transient in a can-type cell when a thermal runaway test was conducted using a laser in a similar way as in FIG. 23, but with a laser of higher power.

The conventional nail penetration test was performed on a cell 20 of the battery system 11 shown in FIG. 2 as Comparative Example 1 (1). A shown in FIG. 18, the cells 20 of the battery system 11, which have been subjected to the nail penetration, did not have an abrupt temperature rise. As a result, the cell 20 did not undergo thermal runaway. Thus, the propagation test could not be completed. The conventional cell overcharging was performed on the cell 20 as Comparative Example 1 (2). In this case, the cell 20 overcharged needed 50 minutes to undergo thermal runaway and severely inflated, breaking the battery system case 30 made of plastic, adjacent the battery system 11. Consequently, the propagation test could not be completed on the battery system 11. The experiment results of Example 1, Comparative Example 1 (1) and Comparative Example 1 (2) are shown in FIG. 10. The test conditions for Example 1, other than those specified in FIG. 10, were as follows: laser wavelength was 1.07 µm; number of cells was 8; and the cell-container thickness was 1 mm.

Example 2

A propagation test similar to Example 1 was performed on a battery system comprising large rectangular parallelepiped cells made of steel, each housed in a cell container made of steel. Each large cell was heated in the same way as in the conventional laser quenching. The cell temperature rose slowly, and the cell gradually inflated. Finally, a large amount of the electrolyte leaked from the cell, and the electrolyte caught fire. Hence, the propagation test was interrupted. A propagation test could be performed, first by using the method of heating the cell by using a laser (disc laser) of this Example 2, thereby forming a melted scar on the cell, and then by carrying out a propagation test, i.e., conventional nail penetration (Comparative Example 2 (1)). The cells adjacent to the cell that has undergone thermal runaway at an initial stage underwent thermal runaway, too, and the battery system failed to pass the propagation test. In the propagation test using the overcharging method (i.e., Comparative Example 2 (2)), the cell inflated very much, and a large amount of the electrolyte leaked out and caught fire. The experiment was therefore interrupted.

The experiment results of Example 2, Comparative Example 2 (1) and Comparative Example 2 (2) are shown in FIG. 11. The test conditions for Example 2, other than those specified in FIG. 11, were as follows: laser wavelength was 1.03 µm; number of cells was 4; and the cell-container thickness was 1.5 mm.

Example 3

Figure 12:
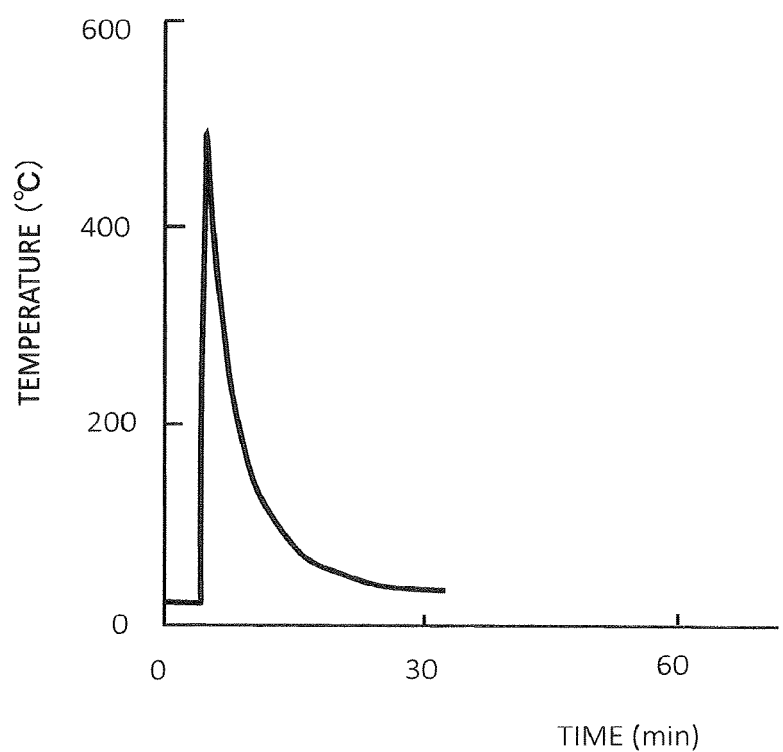
FIG. 12 is a graph showing a measured temperature transient of the light-receiving cell in example 3 (1) of the propagation test according to the present invention.
Figure 17:
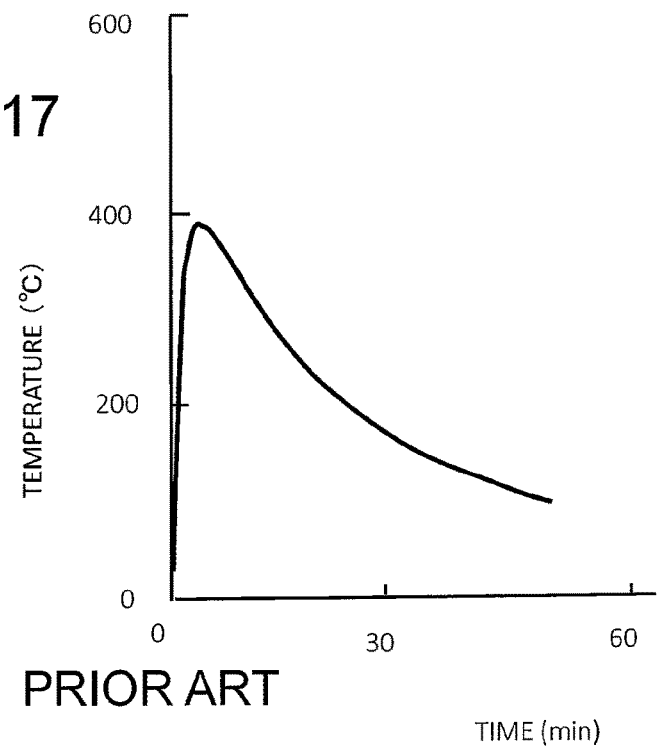
FIG. 17 is a graph showing a measured temperature transient in a can-type cell when a thermal runaway occurred in a thermal runaway test using a conventional nail penetration method.

Next, a laser beam was irradiated on a battery system 11 comprising circular cylindrical cells 20 of the type shown in FIG. 6. More precisely, a YAG-laser beam was irradiated on one of the circular cylindrical cells 20, forming a melted scar on the cell, but not melting down the circular cylindrical cell 20. It was confirmed that the circular cylindrical cell 20 had undergone thermal runaway. The results of the tests are shown in FIG. 12. As seen from FIG. 12, the cell temperature abruptly rose above 400 degrees centigrade, at the laser power of 0.8 kW, and the cell underwent thermal runaway.

On the basis of these results, a propagation test was performed on the light-receiving cell 20a provided in the battery system 11 comprising circular cylindrical cells A, by irradiating a YAG laser beam on the closed container 21 of the light-receiving cell 20a through an opening made in the battery system case 30 for cooling. In this test (Example 3 (1)), the laser beam was irradiated at power of 0.8 kW at which a melted scar is to be formed on the light-receiving cell 20a. After the light-receiving cell 20a had undergone thermal runaway, the laser beam irradiation was stopped, and the battery system was examined for 1 hour. No rupture or ignition was observed in the battery system then. These results confirm that the no abrupt ignition occurred in the battery system in 1 hour after the thermal runaway of the light-receiving cell 20a. This proves that the propagation test was correctly performed and proved that the battery system had resistance against fire propagation.

Further, a laser beam was irradiated on a battery system comprising other circular cylindrical cells B in the propagation test (Example 3 (2)). In this test, the power of the YAG laser was 0.6 kW. In this case, too, the cell temperature abruptly rose above 400 degrees centigrade, and the cell underwent thermal runaway. Then, the adjacent cells underwent thermal runaway, too, and the battery system failed to pass the propagation test. Thus, the method according to Example 3 can determine the fire resistance of the battery system 11 comprising circular cylindrical cells, ultimately to evaluate the design quality and integrity of the battery system 11. The results of this experiment are shown in FIG. 13. The test conditions for Example 3, other than those specified above, were as follows: laser wavelength was 1.06 µm; number of cells was 48; and the cell-container thickness was 0.5 mm.

Example 4

A preliminary test was performed on a battery system comprising rectangular parallelepiped cells C including cell containers made of aluminum, to make a cell undergo thermal runaway. In this test, a laser beam (emitted from a 3.5 kW $CO_2$ laser) was irradiated on the terminal of one cell, heating the cell and forming a melted scar thereon. It was confirmed that the cell underwent thermal runaway within about 1 minute. When the laser beam was irradiated on a metal part near the cell terminal, such as the exhaustion valve in another test, the cell also underwent similar thermal runaway. Further, similar thermal runaway was observed also in a case where the laser beam was irradiated on the vicinity of the lead-out terminals of the electric wires that electrically connect the cells.

Based on the results of these preliminary tests, a propagation test was performed on a battery system comprising rectangular parallelepiped cells C. A laser beam was irradiated on a specified cell (or a light-receiving cell). The temperature of the cell readily rose, and the cell underwent thermal runaway. Thereafter, the battery system was left to stand. Then, the cells adjacent to the specified cell underwent thermal runaway, and the propagation test was successfully performed. And, the battery system failed to pass the propagation test. The results of this experiment are shown in FIG. 14. The test conditions for Example 4, other than those specified above, were as follows: laser wavelength was 10.6 µm; number of cells was 8; and the cell-container thickness was 1 mm.

Example 5

A propagation test according to Example 5 was performed on a battery system comprising laminated cells (not shown). More precisely, a fiber laser was used, irradiating a 0.6 kW laser beam on the aluminum case (i.e., battery system case) containing the laminated cells (Example 5 (1)), forming a melted scar on the battery system case and causing the laminated cell (i.e., light-receiving cell) immediately under the battery system case to undergo thermal runaway. Thus, a propagation test was performed on the battery system. The temperature of the laminated cell readily rose, and the laminated cell underwent thermal runaway. Thereafter, the battery system was left to stand. Then, the cells adjacent to the light-receiving cell underwent thermal runaway in a short period of time. Thus, the propagation test was successful, and the battery system failed to pass the propagation test.

Further, a laser beam was irradiated on a battery system comprising laminated cells of a different structure (Example 5 (2)). In this case, too, a fiber laser was used, irradiating a 1 kW laser beam on the battery system case, forming a melted scar on the battery system case and causing the laminated cell (i.e., light-receiving cell) immediately under the battery system case to undergo thermal runaway. Thus, a propagation test was performed on the battery system. After the thermal runaway of the laminated cell occurred immediately under the battery system case, the battery system was left to stand. Then, the cells other than the light-receiving cell in the battery system did not undergo thermal runaway. One hour later, the test was terminated. The battery system passed the propagation test.

The results of this experiment are shown in FIG. 15. The test conditions for Example 5, other than those specified above, were as follows: laser wavelength was 1.07 µm; number of cells was 4; and the thicknesses of the battery system cases were 1.2 mm and 2.0 mm for Examples 5 (1) and 5 (2), respectively.

Example 6

The method of performing a propagation test, i.e., the second embodiment of the invention (FIGS. 6 and 7), will be described. The propagation test according to the second embodiment was performed on a battery system comprising circular cylindrical cells D, each having a closed container that has a relatively small wall thickness. When a laser beam was irradiated on an outer member of the cells, the outer member melted down and the electrolyte then leaked out in some cases.

In view of this, the light-receiving member 61 made of metal was arranged, opposing the closed container (outer member) 21 of the light-receiving cell 20a, and a laser beam emitted at 1.2 kW from a fiber laser was irradiated on the light-receiving member 61. Then, the laser beam easily formed a melted scar, while preventing the outer member from melting down. Thus, the light-receiving cell reliably underwent thermal runaway.

On the basis of the results of those preliminary tests, a part of the battery system case 30 was removed, forming an irradiation window 60, and the light-receiving member 61 was then arranged at the irradiation window 60. Then, a propagation test was performed. The light-receiving cell reliably underwent thermal runaway. Thereafter, the laser-beam irradiation was interrupted, and the battery system 11 was left to stand for 1 hour. The cells other than the light-receiving cell 20a in the battery system did not undergo thermal runaway, and the battery system passed the propagation test. The results of this experiment are shown in FIG. 16. The test conditions for Example 6, other than those specified above, were as follows: laser wavelength was 1.07 µm; number of cells was 20; and the cell-container thickness was 0.5 mm.

Other Embodiments

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of propagation test on a battery system including a plurality of cells, each having an outer member made of metal including a closed container made of metal, the method comprising:
   a main irradiation step of irradiating a laser beam in prescribed conditions, on a light-receiving part of the outer member of a light-receiving cell, which is one of the cells, the light-receiving part being made of metal, or on a light-receiving part made of metal which is arranged in contact with the outer member of the light-receiving cell, thereby to heat the light-receiving cell;
   a thermal runaway confirming step of confirming a thermal runaway of the light-receiving cell, while the main irradiation step is being performed;
   an irradiation stopping step of stopping the laser-beam irradiation after the thermal runaway was confirmed in the thermal runaway confirming step;
   a system integrity inspection step of inspecting an integrity of the cells other than the light-receiving cell in the battery system after the irradiation stopping step; and
   before the main irradiation step:
   a preliminary irradiation step irradiating laser beams of different conditions on a preliminary test light-receiving member made of metal having a preliminary test light-receiving part same in structure on the light-receiving part; and
   an irradiation condition selecting step, of selecting an irradiation condition, in which a melted scar is formed on the preliminary test light-receiving part, on a basis of a result of the preliminary irradiation step; wherein
   the prescribed conditions are conditions in which a melted scar is formed on the light-receiving part, and
   in the main irradiation step, the laser beam is irradiated in the irradiation condition selected in the irradiation condition selecting step.

2. The method according to claim 1, wherein the main irradiation step includes:
   a position shifting step of shifting an irradiation position on the light-receiving cell; and a melted scar confirming step of confirming that a melted scar is formed on the metal surface of the light-receiving part irradiated with the laser beam.

3. The method according to claim 1, wherein the light-receiving part is a part of the closed container.

4. The method according to claim 1, wherein
the outer member includes a metal member protruding from the outer surface of the closed container, and
the light-receiving part is a part of the metal member.

5. The method according to claim 1, further comprising:
a step of arranging a light-receiving member made of metal outside the closed container of the light-receiving cell, before the main irradiation step, wherein
the light-receiving part is a part of the light-receiving member.

6. The method according to claim 3, wherein
the battery system further includes a battery system case covering all the cells; and
the method further comprises a window forming step of forming an irradiation window in the battery system case before the main irradiation step, so that the laser beam may pass through the irradiation window.

7. The method according to claim 1, wherein
the battery system further includes a battery system case having a metal part, the battery system case covering all the cells; and
the light-receiving part is disposed in a vicinity of the metal part of the battery system case, and is in contact with the light-receiving cell.

8. The method according to claim 1, wherein
the thermal runaway confirming step includes confirming that the fight-receiving cell undergoes thermal runaway when temperature of the light-receiving cell exceeds a prescribed threshold value.

9. The method according to claim 1, wherein each of the cells is a lithium secondary battery having:
an anode and a cathode provided in the closed container;
an insulating layer arranged between the anode and the cathode in the closed container; and
electrolyte contained in the closed container.

* * * * *